United States Patent [19]

Ludin et al.

[11] 4,047,062

[45] Sept. 6, 1977

[54] ROTATING ELECTRICAL MACHINE

[76] Inventors: Ludwig Ludin, Kesselackerweg, CH-5611 Anglikon-Wohlen, Switzerland; Nikolaus Laing, Hofener Weg 35-37, D-7141 Aldingen near Stuttgart, Germany

[21] Appl. No.: 602,671

[22] Filed: Aug. 7, 1975

Related U.S. Application Data

[63] Continuation of Ser. No. 419,216, Nov. 26, 1973, abandoned.

[30] Foreign Application Priority Data

Nov. 28, 1972 Austria .............................. 10108/72

[51] Int. Cl.$^2$ .............................................. H02K 1/12

[52] U.S. Cl. .................................. 310/216; 310/157; 310/254; 310/268

[58] Field of Search ................................ 310/216–218, 310/254–259, 166, 190–193, 157, 268

[56] References Cited

U.S. PATENT DOCUMENTS

| 1,585,566 | 5/1926 | Sindl | 310/268 X |
|---|---|---|---|
| 2,487,846 | 11/1949 | Boelsums | 310/254 |

*Primary Examiner*—Donovan F. Duggan
*Attorney, Agent, or Firm*—Pennie & Edmonds

[57] ABSTRACT

The stator of a rotating electrical machine consists of radially disposed pole teeth, a magnetic circuit closure core surrounded by these pole teeth and a winding, the coils of which are inserted between the pole teeth and envelop the core.

16 Claims, 5 Drawing Figures

ROTATING ELECTRICAL MACHINE

REFERENCE TO OTHER APPLICATIONS

This application is a Continuation of our copending application Ser. No. 419,216 filed Nov. 26, 1973 now abandoned.

THE PRIOR ART

Electric motors are known with stators in which the teeth are formed of substantially radially positioned strip laminations lying parallel to the axis of rotation. These motors, compared with conventional axial gap motors, have great advantages, since, with a given magnetic saturation in the air gap, the magnetic utilisation of the iron can be much greater than that of the so-called axial gap motors, in which the pole area at the air gap coincides with the cross-section of the iron.

However, these known motors have a disadvantage in common with axial gap motors inasmuch as the coils are relatively large in relation to the cross-section of the iron surounded by them. This situation leads to detrimental resistance losses in the copper winding.

The purpose of the invention is the reduction of these resistance losses.

DESCRIPTION OF THE INVENTION

The invention avoids this drawback by arranging the coils no longer in the plane of rotation but in planes lying parallel to the axis. In two-phase designs, the coils lie at right angles to each other. In threephase designs, the coils are set at an angle at 120° against each other. In this way, extremely compact motor designs are achieved, in which the total wire length used is substantially shorter than in comparable known motors.

The solution of the problem according to the invention is of particular advantage in association with motors which have a conical or spherical air gap and in which the air gap surface boundaries with the stator are convex or spherical. Such motors can, according to the invention, also be made with two rotors. This possibility, particularly in an application to two-stage blowers, is of great significance.

For a better utilisation of the winding space remaining between the teeth, the invention provides with advantage also for teeth unevenly distributed over the circumference. The wider spacing between two teeth is then filled with the main coils, whilst the more narrow spacing is filled with the auxiliary coils.

Another embodiment of the invention provides a magnetic circuit closure body not in the form of a cylinder with flat face discs but of dumb-bell shape in a plane through the axis, i.e., the body has a larger cross-section at the periphery than in the middle. In this way, it becomes possible to deform the coils into a dumb-bell shape after insertion. The first coils are pulled in, in the region of the axis after insertion so that the second set of coils finds space in the pulled-in region.

A form of embodiment of the invention consists in applying conical magnetic circuit closure elements in place of flat sheets or rings. Such elements permit a unilateral non-symmetrical deformation, in which the coils are so shaped that they have one concave and one convex region each. The separating cup of pump motors can preferably be inserted into the concave region. In this way, the teeth become particularly short and, correspondingly, have a small leakage.

It has been found that the noise generation is greatly affected by the number of slots in the rotor. The optimum design solution has been found in a rotor which consists of a ring of soft iron and forms an electrically well conducting unit at both axial ends with a material of good electrical conductivity, e.g., rings of electrolytic copper.

Furthermore, it has been found that slotted armatures have a more favourable noise behaviour when they are covered by a cap of soft ion. The invention will be described with the help of figures.

FIG. 1b shows an axial cross-section of the entire rotating machine along the section line 1b—1b drawn in FIG. 1a.

Figure 1A:
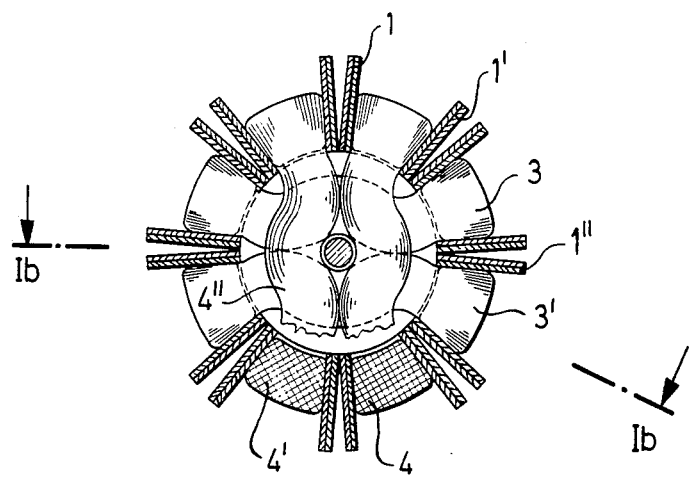
FIG. 1a shows a plan view of the stator of a rotating machine according to the invention.
Figure 1B:
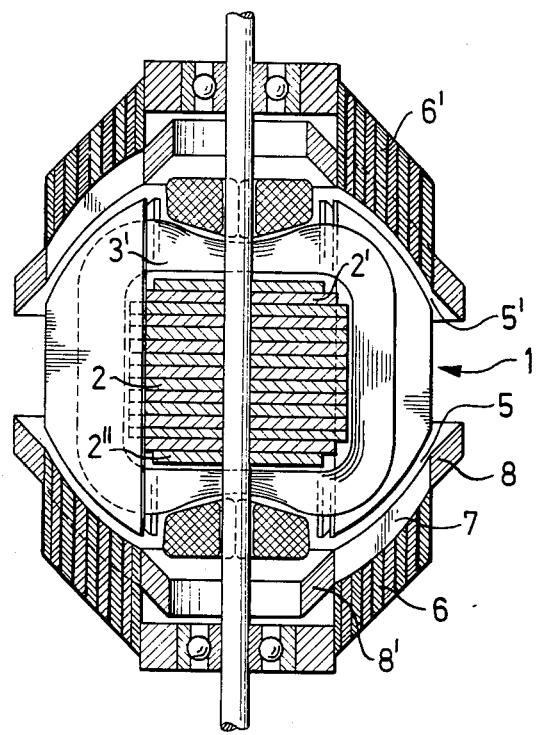

FIGS. 1a and 1b show a plan view of the stator and a cross-section of a motor according to the invention. The pole teeth 1, 1', 1" consist of lamination strips of the same type. These teeth are interconnected in a magnetically conducting manner on the side opposite that facing the rotor by means of lamination strips 2 surrounded by the winding. The joining of the teeth to the lamination strips can be performed by adhesive bonding, soldering or similar means or else by positive engagement, too. In the latter case, the teeth and the magnetic circuit closure core are held together, for example, by means of an annular band (not shown) enveloping the stator. Coils are wound between the teeth. The coils 3 and 3' touch over their entire circumference the iron stack formed by the laminations 2, 2' and 2", whilst the coils 4 and 4' are wound over the coils 3 and 3'. The number of coils is guided by the number of teeth and by the desired grading of the magnetic flux over the circumference. The teeth are so formed at either one axial end or both axial ends, that they finish at a spherical air gap 5 or 5', respectively. The armatures 6 or 6', respectively, consist of a conically wound iron ring provided with slots, into which conductor rods 7 are inserted, which are interconnected by short-circuit rings 8 and 8'. Conductor rods and short-circuit rings of aluminum or electrolytic copper can also be inserted into the coiled iron ring in one piece by the pressure die casting process.

Figure 2:
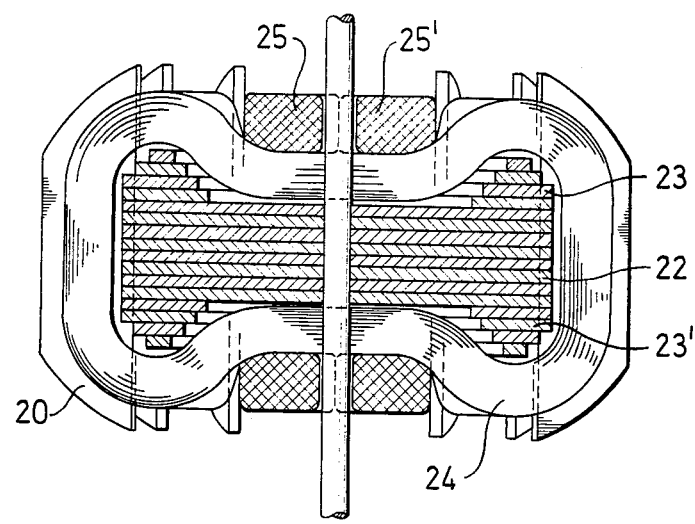
FIG. 2 shows an axial cross-section through a further embodiment of the stator of a motor according to the invention.

Figure 2 shows an embodiment of a motor according to the invention, in which the teeth 20 are arranged around a magnetic circuit closure body consisting of disc 22 and rings 23 and 23' having different radial extensions. The inner set of coils 24 is deformed into dumb-bell shape after being laid over the core 22/23. After this, the coil set 25/25' is laid over the coils 24. In this way, the height of the coil package becomes smaller than in the embodiment shown in FIG. 1.

Figure 3:
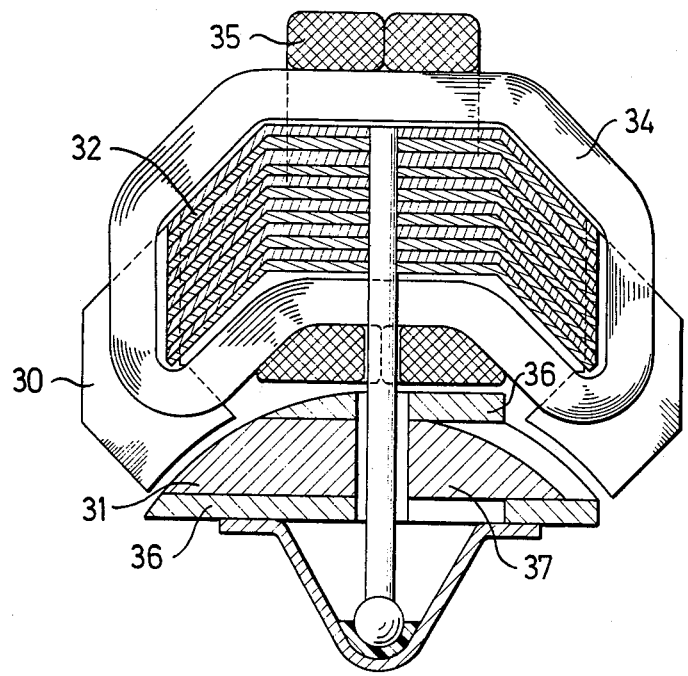
FIG. 3 shows, in an axial cross-section, a third embodiment of a motor according to the invention.

FIG. 3 shows, in cross-section, a so-called spherical motor in which the invention is embodied. The teeth 30 are so formed towards the armature 31 that the air gap has the shape of a spherical surface. The magnetic circuit closure body 32, however, does not consist, as in previously shown embodiment, of discs or rings but of truncated cone elements. The coil 34 is so deformed on the side facing the armature 31 that it can be pressed into the hollow space of the cone-shaped elements 32.

The coil 35 is then lain over the coil 34. In this way, an extremely space-saving embodiment is achieved, in which the teeth 30 become particularly short. This leads not only to material savings but also to a smaller leakage losses.

As shown in Figure 3, the armature of the motor has two rings 36 comprising a conducting material, for example copper, which encloses an iron ring 37 of the type to form an armature 31.

Figure 4:
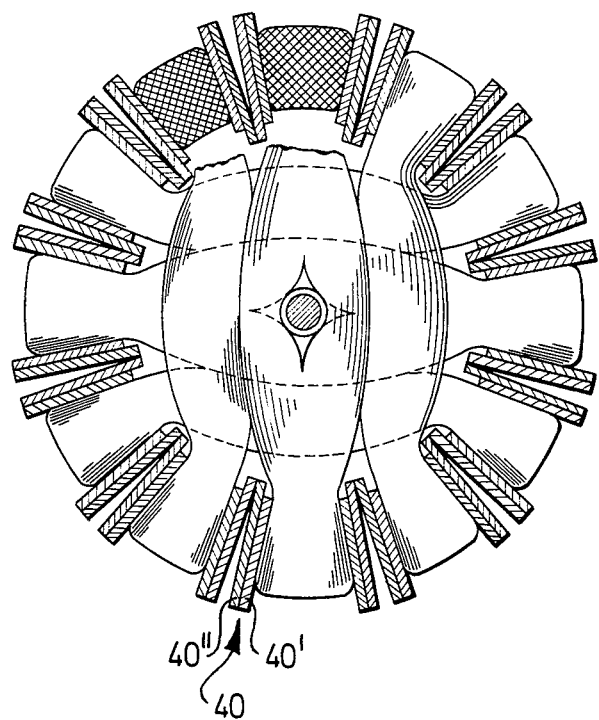
FIG. 4 shows, in plan view, a further embodiment of a stator.

Figure 4 shows an embodiment of a motor according to the invention in which the teeth 40 are formed of radially disposed lamination strips, among which the externally placed strips 40' have a smaller radial extension than the strips enclosed between them 40''. In this way, a greater annular width between the teeth is achieved for the coils and a less narrow contraction of the winding inside the tooth laminations. The outward-pointing edges of the lamination strips lie on an imaginary cylinder.

As shown in the drawings, portions of the coils in each of the embodiments surround both axial ends of a magnetic circuit closure body in radial extending planes while the outer circumferential surface of the body is surrounded by portions of the coils extending in axial planes. Thus, for example, in the embodiment of FIGS. 1a and 1b, coils 4 and 4' surround the axial ends of the magnetic closure body comprising laminated strips 2 in radial extending planes while the outer surface of the body is surrounded by portions of the same coils in axially extending planes.

We claim:

1. An electric motor including a rotatable armature, a stator having a plurality of circumferentially spaced pole teeth which extend substantially parallel to the axis of rotation of the armature, a magnetic circuit closure body having two axial ends magnetically connecting said teeth and extending axially along said axis, and a plurality of coils for generating a magnetic force in said teeth, the improvement comprising in that each said coil is positioned in a circumferential space between circumferentially adjacent teeth, in that said coils are circumferentially spaced from each other at a predetermined angle dependent upon the number of phases of excitation, in that each said coil has portions surrounding the two axial ends of said magnetic circuit closure body in radially extending planes and portions surrounding the circumferential surface of said magnetic closure body in axially extending planes and in that said pole teeth comprise strips arranged in radially extending planes.

2. An electric motor according to claim 1 wherein said coils substantially fill the circumferential spaces between adjacent teeth.

3. An electric motor according to claim 1 in that portions of said coils near said axis are wider than portions of said coils in the circumferential spaces.

4. An electric motor according to claim 1 wherein said magnetic circuit closure body comprises a plurality of circular radially extending laminations, the laminations at the axial ends of said magnetic closure body having a smaller diameter than the laminations comprising the remainder of said magnetic closure body.

5. An electric motor according to claim 1 wherein surfaces of said pole teeth face an air gap between the stator and armature and form a portion of a conical surface.

6. An electric motor according to claim 1 wherein the surfaces of said pole teeth face an air gap between the stator and armature and form a portion of a spherical surface.

7. An electric motor according to claim 1 having in addition a second rotatable armature positioned coaxially of the first armature and wherein surfaces of the pole teeth face an air gap between the stator and each armature.

8. An electric motor according to claim 1 wherein said magnetic circuit closure body comprises a plurality of flat laminations and having a ring at each of its axial ends.

9. An electric motor according to claim 8 wherein a plurality of rings of varying diameters are included at each axial end of said magnetic closure body.

10. An electric motor according to claim 8 characterized in that a first coil having a dumbbell shape surrounds said magnetic circuit closure body and in that a second coil having a dumbbell shape overlies said first coil.

11. An electric motor according to claim 1 wherein said magnetic circuit closure body comprises a plurality of laminations in the form of truncated cones.

12. An electric motor according to claim 1 wherein the radial ends of each said laminations extend parallel to the axis of rotation of said armature.

13. An electric motor according to claim 12 wherein said coils are shaped to follow the contour of the cross-section of said magnetic circuit closure body.

14. An electric motor according to claim 1 wherein said armature comprises two rings of an electrically conductive material and an iron ring positioned between said rings of electrical conductible material.

15. An electric motor according to claim 1 wherein each of the pole teeth comprises a plurality of radially extending laminations and wherein the laminations forming a circumferential side of a tooth have a smaller radial diameter than the laminations in the interior of the tooth.

16. An electric motor according to claim 15 wherein the outer radial edges of said laminations form a part of a cylindrical surface.

* * * * *

UNITED STATES PATENT AND TRADEMARK OFFICE
CERTIFICATE OF CORRECTION

PATENT NO. : 4,047,062
DATED : September 6, 1977
INVENTOR(S) : Ludwig Ludin and Nikolaus Laing It is certified that error appears in the above-identified patent and that said Letters Patent are hereby corrected as shown below:

Claim 12, line 1, "1" should be --11--;

Signed and Sealed this

Twenty-second Day of November 1977

[SEAL]

Attest:

RUTH C. MASON
Attesting Officer

LUTRELLE F. PARKER
Acting Commissioner of Patents and Trademarks